April 3, 1934.    E. BENEDEK    1,953,211
FLEXIBLE ELASTIC COUPLING
Filed Feb. 2, 1932

WITNESSES:

Inventor
ELEK BENEDEK
By Baldwin & Wight
his Attorneys

Patented Apr. 3, 1934

1,953,211

UNITED STATES PATENT OFFICE 1,953,211

FLEXIBLE ELASTIC COUPLING

Elek Benedek, Mount Gilead, Ohio, assignor to The Hydraulic Press Manufacturing Company, Mount Gilead, Ohio Application February 2, 1932, Serial No. 590,417

15 Claims. (Cl. 64—96)

This invention relates to flexible elastic couplings for the use of power transmission between two coaxial shafts.

Shaft couplings of the type referred to consist ordinarily of two parallel flanges interconnected by some resilient means. This interconnection is, however, in present designs not satisfactory under all conditions. There are operating conditions where the flexibility of the coupling is not sufficient either for the parallel misalignment of the shafts, or for the angularity of them. In designs heretofore known, to meet extreme misalignment conditions, it has been necessary to use two couplings. In addition to the expense of such installations, the insufficient flexibility results in wear and friction in the coupling mechanism and decreases the efficiency of the transmission, or it causes breakage of the interconnecting members. In most cases the design is such that the application of sufficient size and number of interconnecting elastic members is impossible.

It is the purpose of the present invention to remedy the above named conditions by the provision of an elastic coupling in which there is no limitation as to the conditions under which power transmission occurs. In my novel coupling, under any of above mentioned extreme conditions the coupling members will float freely in any direction due to the floating arrangement of their interconnecting coupling members.

A further object of my invention is to provide a coupling which absorbs shocks and periodic vibrations usually inherent in the driving shaft at a cost of a minimum amount of frictional loss but at the cost of free elastic energy of the coupling interconnecting resilient member.

A further object is the provision of a coupling with the greatest possible capacity and flexibility in a given minimum space. This I accomplish by a novel combination of parts wherein the elastic element is deflected around a longitudinal axis instead of a transverse section. And because it will be seen that there is no limitation in making the element long enough, it is obvious that this novel arrangement will provide a stronger coupling than present conventional types.

I have not overlooked the fact that the floating relation of all the coupling elements provides for a silent coupling when in operation.

Other advantages of my invention are hereinafter referred to.

According to the present invention the coupling consists of two flanged steel discs, each disc being keyed to its respective shaft, and a one-piece tempered steel spring forming a ring of radiating shanks, interconnected by a series of peripheral and inner loops. On the opposed faces of the flanges in normal direction is a plurality of teeth on each flange face extending in radial direction. Between the teeth of the flanges is the spring for axial assembly. The spring is the flexible member and its shape and that of the teeth form one characteristic feature of the coupling. The radially extending and normally aligned two sets of teeth have interspaces which diverge tangentially from the root of the teeth inwardly. Between each pair of teeth is a shank of the elastic element and the power is transmitted through the long and wide flexible shoulders of the spring resting on the outer ends of the teeth. Whenever load occurs the spring shanks engage the inner parts of the teeth as supports shortening their span. The teeth contours are such that the shortening of the span is in direct proportion to the increase of torque, whereby the stress in the members remains practically constant throughout the entire elastic range of the coupling. The elastic deformation of the members is to strengthen them against more deflection, so that the coupling will stand safely greater momentary shocks than any other elastic type.

In addition to this well known feature of flexibility from prior art, namely the application of the variable length support principle, my invention combines with this a novel feature, namely, application of the principle of variable section bending. It will be pointed out in more detail later on that the longitudinal extension of the spring members being radial, and the width being axial, under normal load, the radial stress zone in the members extends approximately to the radial length of the teeth. However, at greater than normal load when a greater deformation occurs a much longer radial section will be subject to bending. In this maximum deformation the ends of the shanks are involved and thus it is evident that the greater the shock or instantaneous torque increment, the greater becomes the active radial length of the involved spring members.

It will be pointed out later on also that by virtue of the novel arrangement of parts in this device the loop portions of the spring members are involved in the useful elastic resistance of the spring. It is evident now, that because the axial side ends of the shanks are snugly confined between the teeth of the flanges, and the entire spring body is between the supports therefor it follows that almost the entire spring partakes in the useful power transmission whereas in eminent designs heretofore known the loop portions are outside of the sphere of action.

Other more specific objects and advantages will appear from the following description of an illustrative embodiment of the present invention.

Figures 1, 2, 3, 4:
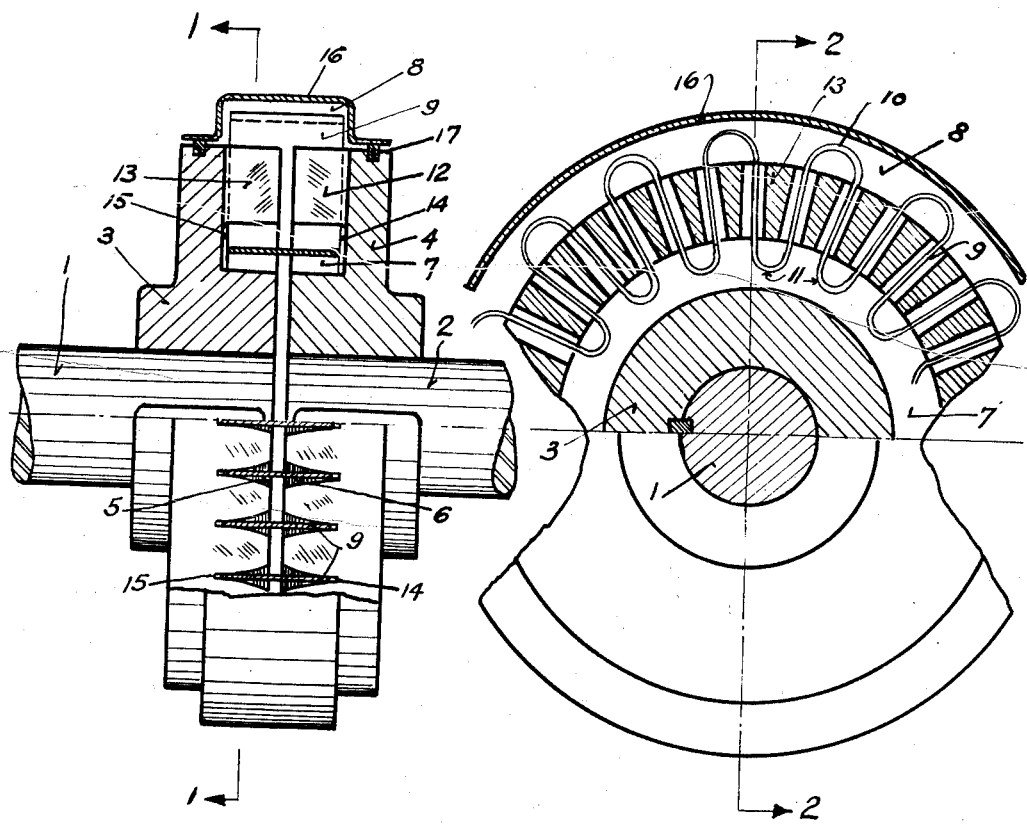
Fig. 1 is a view partly in section and partly in front elevation of this novel type of coupling, constructed in accordance with the present invention. The section is taken through the upper half of the coupling on line 2—2 in Fig. 2.
Figure 2 is a view partly in section and partly in side elevation of present coupling. The section is taken on line 1—1 in Fig. 1.
Figures 3 and 4 are detail views respectively in front and side elevation of the load transmitting spring.

In Fig. 1 cooperative shafts 1 and 2 are assembled with cooperative coupling halves 3 and 4 respectively. Each coupling half is formed to have a series of radially disposed tapered grooves 5 and 6 which open radially inward into an annular space 7 and outwardly into an annular space 8. An annular spring body comprising a plurality of radially extending shanks 9 interconnected by loops 10 and 11 serves operatively to connect the coupling halves 3 and 4. The radially extending shanks are assembled in the normally aligned radial grooves 5 and 6 of the coupling halves 3 and 4 and the loops 10 and 11 occupy the annular spaces 7 and 8 respectively. The grooves 5 and 6 are defined respectively by opposed sets of radially extending teeth 12 and 13 provided with inwardly and axially convergent surfaces which enclose snugly between their inner portions the shanks 9 so that at normal load the supported lengths of the shanks are maximum and approximately equal to the width of the spring. However, under load, this length may become shortened to the internal face distance of the coupling discs in which deformed position all the shanks will oppose the shearing force and will effect the transmission of a torque much greater than the elastic torque of normal conditions. Axial clearances 14 and 15 between the radial edges of the shanks 9 and the bottoms of the grooves 5 and 6 are provided for axial freedom of the floating spring and the sum of their axial length is approximately equal to the distance between the adjacent faces of the shafts. A light cylindrical cover 16 with appropriate sealing packing 17 to retain lubricant inside the casing is provided.

It is evident from Figures 1 and 2 that the spring is free to float radially and axially and free for tangential deformation in slots 5 and 6. Assuming there is an excessive angular misalignment of the shafts, the spring will not be affected at all but it will float freely in its normal radial position between the cooperative faces of the teeth 12 and 13. The loops 10 and 11 are formed of sufficient length, so that the deformation of one shank will not affect greatly the deformation of the others. Therefore, all the shanks can be regarded as individual load transmitting members with radial-axial surfaces.

It will be seen that by the radial teeth arrangement and radially extending shanks this coupling will transmit greater torque than same diameter couplings of present design.

The reason for a greater power transmitting capacity of present design lies in the fact that the deformation is extended to the whole length of each shank member and is not confined to a transverse section of the shanks. It is further to be seen that the greater the torque becomes, the greater will be the length of the radial shanks involved in the useful deformation.

It is an inherent advantage of the present invention that the radial series of spring shanks 9 engaged in the radial series of coupling grooves and interconnected by means of the loops 10 and 11 automatically balance each other against the tendency of the centrifugal force to shift outwardly the shanks from their cooperative grooves. It will be noticed that the interconnected shanks in being inwardly convergent resist the outward action of the centrifugal force along the radial, outwardly divergent tooth surfaces. It will be seen that it is impossible in this assembly for the cooperative working surfaces to be disengaged by the action of the centrifugal force.

Various changes may be made in the embodiment of the present invention hereinabove specifically described without departing from the invention as defined in the appended claims:

I claim:

1. In a flexible elastic coupling of the character described the combination of two axially spaced parallel members interconnected for driving relation by a continuous torque transmitting floating member including radial shanks and inner and outer connecting loops, said first members having a plurality of tooth interspaces in oppositely aligned relation, said interspaces have free radial communication with axially extending and concentrically located counterbores provided in said first members inside of their teeth for the purpose of providing accommodation and radial floating for the cooperative shanks and inner loops of last said member; a cylindrical cover surrounding the outer loops of said floating member to provide for radial clearance and radial floating of said outer loops.

2. In a flexible elastic coupling of the character described the combination of two axially spaced parallel members interconnected for driving relation by a continuous torque transmitting floating member, said axially spaced members having a plurality of tooth interspace grooves in oppositely aligned relation and extending in substantially radial directions, and said floating member having a plurality of substantially radially extending sections each being positioned in both of a pair of aligned tooth interspace grooves, and being adapted to contact with the walls thereof along substantial radial extents of the latter, said tooth interspaces being extended beyond the radial edges of said interposed torque transmitting member to provide axial clearance spaces between said parallel members at the bottoms of said grooves and said edges of said torque transmitting member.

3. In a flexible coupling, the combination of two opposed coupling members provided with a plurality of normally aligned radially extending grooves open radially at their ends, and a torque transmitting member having shank portions lying in aligned grooves of said coupling members and unconfined connecting portions between adjacent shanks lying exteriorly of said grooves and beyond their radially opening ends.

4. In an elastic coupling, the combination of two axially spaced members having a plurality of normally aligned, radially extending grooves open radially at their inner and outer ends; and means interconnecting said members in driving relation comprising a plurality of radially extending shanks disposed respectively in opposed grooves in said members, and portions connecting adjacent shanks beyond the inner and outer radially opening ends of said grooves.

5. In an elastic coupling, the combination of two axially spaced members having a plurality of normally aligned, radially extending grooves open at their inner and outer ends; and means interconnecting said members in driving relation comprising a floating torque transmitting member of flexible material comprising a plurality of radially extending shank portions disposed respectively in opposed grooves in said first two members, and unconfined curved portions intervening between and connecting adjacent shanks beyond the inner and outer ends of said grooves.

6. In an elastic coupling, the combination of two axially spaced members having a plurality of normally aligned, radially extending grooves open at their inner and outer ends; and means interconnecting said members in driving relation comprising a floating torque transmitting member of flexible material comprising a plurality of radially extending shank portions disposed respectively in opposed grooves in said first two members, and unconfined curved portions intervening between and connecting adjacent shanks beyond the inner and outer ends of said grooves, said first two members being formed to provide an annular space in which the connecting portions beyond the inner ends of said grooves are disposed and said first two members being disposed out of contact with the connecting portions beyond the outer ends of said grooves, whereby to provide for free movement of said torque transmitting member and to allow without confinement elastic deformation of said connecting portions to utilize said connecting portions for transmitting torque when the load becomes excessive and the radial shanks become deformed throughout their radial lengths.

7. In a flexible coupling, the combination of two axially spaced members having a plurality of opposed radially extending normally aligned teeth, said teeth having curved surfaces defining series of radially extending grooves open readily at their inner and outer ends; and means interconnecting said members in driving relation comprising a plurality of radially extending shanks disposed respectively in opposed grooves in said members, and portions connecting adjacent shanks beyond the radially opening outer and inner ends of said grooves, said connecting portions being unconfined and free to float whereby said shanks will have a variable span and variably stressed cross section according to variations in the torque transmitted.

8. In a flexible coupling, the combination of two axially spaced members having opposed faces formed with a plurality of normally aligned radially extending grooves open radially at their inner and outer ends and which gradually become more narrow towards their bottoms or roots, and means interconnecting said members in driving relation comprising a plurality of flat radially extending shanks disposed respectively in opposed grooves in said members, adjacent shanks being connected beyond the radially open inner and outer ends of said grooves.

9. In a flexible coupling the combination of two axially spaced parallel members provided with a plurality of opposed teeth, and means for interconnecting the teeth of said members in driving relation comprising a continuous torque transmitting resilient floating member having a plurality of radially extending shanks, and a plurality of flexible loop portions interconnecting the inner and outer radial ends of said shanks, the arrangement being such that said inner and outer loop portions elastically resist the radial displacement of the shanks due to centrifugal force of rotation, and thereby maintain permanent engagement between said teeth and shanks irrespective of the amount and nature of the misalignment of said parallel members.

10. In a flexible elastic coupling of the character described the combination of two axially spaced parallel members interengaged for driving relation by a continuous torque transmitting floating member, said first members having a plurality of radially extending and normally aligned coupling elements, said floating member having a plurality of radial shanks disposed in engagement with aligned elements of said parallel members, and a plurality of flexible loop portions interconnecting the inner and outer radial ends of said shanks to form a continuous radial ring of loops for cooperation with said coupling elements in such a way that the deformation of the interposed elastic shanks occurs substantially around the radially extending longitudinal axis of the torque transmitting shanks and thus to engage the longitudinal cross section of the shank to transmit torsional resistance and thereby utilize the torque capacity of said torque transmitting member throughout its entire winding length.

11. In a flexible elastic coupling, the combination of a pair of parallel coupling halves having a plurality of circularly disposed, radially extending and normally aligned teeth, the intertooth spaces of each coupling half opening radially inwardly and outwardly at their inner and outer ends respectively; and means interconnecting said coupling halves comprising a continuous spring element of flat material having radially extending portions disposed in opposed intertooth spaces of said coupling halves and loop connecting portions between adjacent radially extending portions, the arrangement being such as to permit axial assembly of said coupling halves and said spring element.

12. In a flexible coupling, the combination of two opposed coupling members each provided with a plurality of aligned radially extending grooves, and a plurality of flat resilient torque transmitting shanks fitted loosely respectively in aligned grooves of said coupling members, said grooves being open at their radial outer ends and the distance between bottoms of aligned grooves being greater than the width of the associated shanks in axial direction, said shanks having a limited amount of play in both axial and radial directions.

13. In a flexible elastic coupling of the character described, the combination of two axially spaced parallel members, and means for interconnecting said members in driving relation comprising a continuous torque transmitting floating member, said member having a plurality of radially extending shanks and portions free from contact with said parallel members connecting the radially inner and outer ends of said shanks, said shanks having resiliency around their longitudinal radial central axes.

14. In a flexible elastic coupling, a pair of coaxially rotating parallel driving and driven coupling members having normally aligned tangentially flaring spaces and means for interconnecting said members comprising a continuous resilient member having a plurality of shanks extending through and radially beyond said spaces and being free to float in axial and radial directions and being resilient around their radially extending longitudinal axes, the radial extents of said shanks subjected to bending increasing with the load, said shanks being assembled for axial withdrawal in the normally aligned and tangentially flaring spaces of said coupling members.

15. In a flexible elastic shaft coupling, the combination of a pair of oscillatorily rotating coupling halves provided with aligned radially extending tooth-like portions interconnected by torque transmitting means including a plurality of radially extending parts extending through and radially beyond the grooves between said tooth-like portions and having free disposition to float in axial and radial directions, and freedom to yield tangentially, the radial extents of said parts subjected to bending increasing with the load.

ELEK BENEDEK.